United States Patent
Joseph et al.

(10) Patent No.: US 11,579,609 B2
(45) Date of Patent: Feb. 14, 2023

(54) IDENTIFYING A ROUTE FOR AN AUTONOMOUS VEHICLE BETWEEN AN ORIGIN AND DESTINATION LOCATION

(71) Applicant: GM Cruise Holdings LLC, San Francisco, CA (US)

(72) Inventors: Antony Joseph, San Francisco, CA (US); Geoffrey Louis Chi-Johnston, San Francisco, CA (US); Nimish Patil, Pleasanton, CA (US); Vishal Suresh Vaingankar, Kensington, CA (US); Laura Athena Freeman, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 38 days.

(21) Appl. No.: 17/364,761

(22) Filed: Jun. 30, 2021

(65) Prior Publication Data
US 2021/0325883 A1    Oct. 21, 2021

Related U.S. Application Data

(63) Continuation of application No. 16/358,206, filed on Mar. 19, 2019, now Pat. No. 11,086,322.

(51) Int. Cl.
| | | |
|---|---|---|
| G05D 1/08 | (2006.01) | |
| G05D 1/02 | (2020.01) | |
| G05D 1/00 | (2006.01) | |

(52) U.S. Cl.
CPC ......... *G05D 1/0088* (2013.01); *G05D 1/0221* (2013.01); *G05D 1/0223* (2013.01); *G05D 2201/0213* (2013.01)

(58) Field of Classification Search
CPC .. G05D 1/0088; G05D 1/0221; G05D 1/0223; G05D 2201/0213; B60W 60/001; G01C 21/3492; G01C 21/3461
See application file for complete search history.

(56) References Cited

U.S. PATENT DOCUMENTS

| | | |
|---|---|---|
| 8,190,330 B2 | 5/2012 | Lee |
| 8,244,408 B2 | 8/2012 | Lee et al. |
| 9,020,749 B2 | 4/2015 | Aso et al. |
| 9,050,980 B2 | 6/2015 | Dariush et al. |
| 9,342,986 B2 | 5/2016 | Dariush |
| 9,568,915 B1 | 2/2017 | Berntorp et al. |
| 9,573,592 B2 | 2/2017 | Prokhorov et al. |

(Continued)

OTHER PUBLICATIONS

"Non-Final Office Action for U.S. Appl. No. 16/358,206", dated Jan. 25, 2021, 24 Pages.

(Continued)

*Primary Examiner* — Rodney A Butler
(74) *Attorney, Agent, or Firm* — Calfee, Halter & Griswold LLP

(57) ABSTRACT

Described herein are technologies relating to computing a likelihood of an operation-influencing event with respect to an autonomous vehicle at a geographic location. The likelihood of the operation-influencing event is computed based upon a prediction of a value that indicates whether, through a causal process, the operation-influencing event is expected to occur. The causal process is identified by means of a model, which relates spatiotemporal factors and the operation-influencing events.

20 Claims, 12 Drawing Sheets

(56) References Cited

U.S. PATENT DOCUMENTS

| | | |
|---|---|---|
| 10,126,136 B2 | 11/2018 | Iagnemma |
| 2012/0083960 A1 | 4/2012 | Zhu et al. |
| 2017/0245419 A1 | 8/2017 | Barbosa et al. |
| 2017/0352103 A1 | 12/2017 | Choi et al. |
| 2019/0278271 A1 | 9/2019 | Blumer et al. |
| 2020/0047769 A1 | 2/2020 | Oguro et al. |
| 2020/0073382 A1* | 3/2020 | Noda .................. G05D 1/0088 |
| 2020/0192386 A1 | 6/2020 | Stenneth |
| 2020/0301419 A1 | 9/2020 | Joseph et al. |

OTHER PUBLICATIONS

"Reply to Non-Final Office Action for U.S. Appl. No. 16/358,206", filed May 25, 2021, 11 Pages.

"Notice of Allowance and Fees Due for U.S. Appl. No. 16/358,206", dated Jun. 8, 2021, 5 Pages.

* cited by examiner

IDENTIFYING A ROUTE FOR AN AUTONOMOUS VEHICLE BETWEEN AN ORIGIN AND DESTINATION LOCATION

RELATED APPLICATION

This application is a continuation of U.S. patent application Ser. No. 16/358,206, filed on Mar. 19, 2019, and entitled "IDENTIFYING A ROUTE FOR AN AUTONOMOUS VEHICLE BETWEEN AN ORIGIN AND DESTINATION LOCATION". The entirety of this application is incorporated herein by reference.

BACKGROUND

An autonomous vehicle is a motorized vehicle that can operate without a human operator (i.e., a driver). An exemplary autonomous vehicle includes a plurality of sensor systems, such as but not limited to, a lidar sensor system, a camera sensor system, and a radar sensor system, amongst others. The autonomous vehicle operates based upon sensor data output by the sensor systems.

Typically, an autonomous vehicle operates autonomously (i.e., without a human driver taking control of the autonomous vehicle) along a route from an origin location to a destination location. However, in certain driving scenarios, a human driver may take control of the autonomous vehicle. In other driving scenarios, the autonomous vehicle may be required to perform an unplanned maneuver along the route in order to arrive at the destination location. Furthermore, the autonomous vehicle may be subject to events along the route that, while not altering behavior of the autonomous vehicle itself, are nevertheless undesirable.

Autonomous vehicles generate large amounts of data as the autonomous vehicles operate, wherein the data is assigned to geographic locations. For instance, the data may indicate that an intersection in a city tends to have a large amount of pedestrian traffic at a certain time of day (and thus it may be desirable for the autonomous vehicle to avoid the intersection at the certain time of day or for a penalty to be applied to a route that passes through the intersection). However, a sparse amount of data (or no data) may exist for a geographic location, as the geographic location has not been travelled through by many autonomous vehicles. In another example, there may be a sparse amount of data (or no data) for a geographic location at a time of interest (e.g., during rush hour). Hence, a route identified for an autonomous vehicle between an origin location and a destination location may be suboptimal due to lack of information about, for example, intersections that will be traversed by the autonomous vehicle when navigating the route.

SUMMARY

The following is a brief summary of subject matter that is described in greater detail herein. This summary is not intended to be limiting as to the scope of the claims.

Described herein are various technologies that pertain to inferring a likelihood that an operation-influencing event will occur with respect to an autonomous vehicle at a first geographic location, wherein the likelihood is inferred based upon a likelihood that an operation-influencing event will occur with respect to the autonomous vehicle at a second geographic location that is different from the first geographic location. Additionally, a computer-implemented model is described herein, wherein the computer-implemented model is constructed to output a likelihood that an operation-influencing event will occur with respect to the autonomous vehicle at a specific geographic location (and time) even when there is sparse data (or no data) for such geographic location. A route between an origin location and a destination location can be identified based upon inferred likelihoods of operation-influencing events occurring with respect to the autonomous vehicle at geographic locations in candidate routes between the origin location and the destination location.

In operation, a computing system of the autonomous vehicle or in communication with the autonomous vehicle receives an origin location of the autonomous vehicle, a destination location of the autonomous vehicle, and optionally a current time of day, day of week, etc. The computing system identifies a route for the autonomous vehicle to follow from the origin location to the destination location based upon outputs of the computer-implemented model, wherein, as mentioned above, the outputs are indicative of likelihoods of operation-influencing events occurring with respect to the autonomous vehicle. Exemplary operation-influencing events include, for example, a human taking control of the autonomous vehicle, the autonomous vehicle making a sudden stop, the autonomous vehicle making a sudden turn, etc. Thus, for instance, the computing system can identify a route between the origin location and the destination location that has a minimum likelihood of the autonomous vehicle making a sudden stop.

The computer-implemented model is generated based upon training data collected from vehicles (autonomous vehicles, human-operated vehicles, or both). The training data comprises identities of operation-influencing events that occurred with respect to the vehicles, identities of geographic locations (e.g., intersections in a roadway system) where the operation-influencing events occurred and observed spatiotemporal factors that existed in the geographic locations when the operation-influencing events occurred. Accordingly, each operation-influencing event has at least one spatiotemporal factor assigned thereto in the training data. Exemplary spatiotemporal factors include, for example: 1) proximity of pedestrians to the vehicle; 2) number of pedestrians in a field of view of sensors of the autonomous vehicle; 3) number of automobiles in a field of view of sensors of the autonomous vehicle; 4) proximity of automobiles in the field of view of the sensors of the autonomous vehicle; 5) whether a double-parked car is in a field of view of the sensors of the vehicle; 6) weather conditions; 7) type of driving maneuver being performed by the vehicle; 8) time of day; 9) time of year; 10) day of the week; 11) number of bicyclists in a field of view of sensors of the vehicle; 12) whether any emergency vehicles were proximate to the vehicle; and so forth. It can be ascertained that correlations may exist between one or more spatiotemporal factors and operation-influencing events—for example, collected data may indicate that when there are several pedestrians walking across an intersection, there is a relatively high likelihood that a human may take control of the autonomous vehicle. For some geographic locations, however, there may be a relatively small amount of information as to whether, historically, there are pedestrians at the geographic locations. The technologies described herein are related to inferring likelihoods of occurrence of operation-influencing events at geographic locations when there is little or no training data collected at the geographic locations.

The above summary presents a simplified summary in order to provide a basic understanding of some aspects of the systems and/or methods discussed herein. This summary is

DETAILED DESCRIPTION

Figure 1:
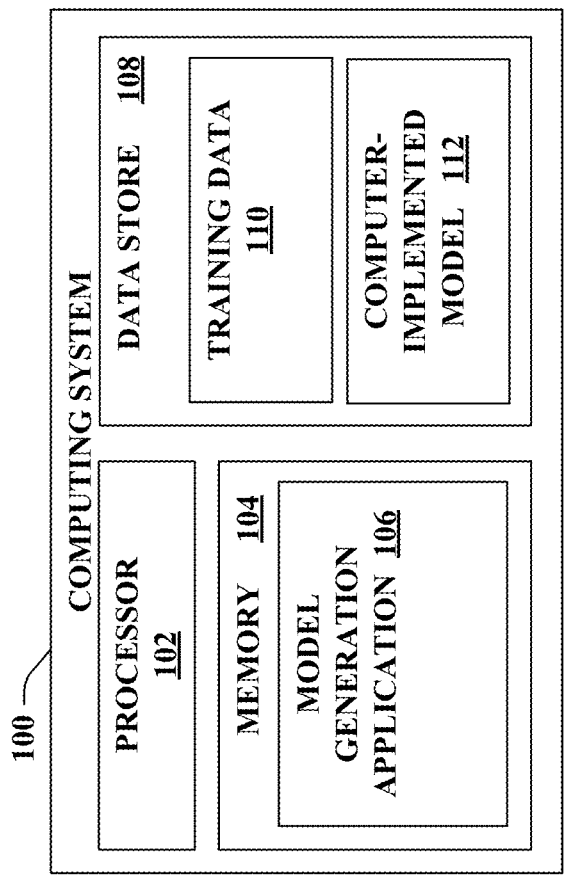
FIG. 1 illustrates a functional block diagram of an exemplary computing system that is configured to construct a computer-implemented model based upon training data.

Various technologies pertaining to routing of an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component," "application," and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean "serving as an illustration or example of something."

Various technologies relating to computing a route for an autonomous vehicle to take between an origin location and a destination location are described herein. When computing the route, a computing system determines values for a plurality of geographic locations (such as roadway intersections) along the route, wherein the values are indicative of a likelihood of occurrence of an "operation-influencing event" with respect to the autonomous vehicle if the autonomous vehicle were to travel through each of the geographic locations. For example, the operation-influencing event may be a human taking control of the autonomous vehicle; thus, for each intersection along a candidate route, the computing system can output a value that is indicative of the likelihood of the human driver overtaking the autonomous vehicle at the intersection. The computing system may then identify the route to be taken by the autonomous vehicle based upon values assigned to the intersections.

The computing system determines such values, for example, through utilization of a computer-implemented model, which is constructed based upon training data that is obtained from vehicles (autonomous vehicles or human-driven vehicles) that travel throughout a geographic region. In a brief example, for purposes of explanation, the training data can include: identities of intersections travelled through by autonomous vehicles; numbers of pedestrians at the intersections in the geographic region as observed by the autonomous vehicles; and indications as to whether human drivers took control of the autonomous vehicles at the intersections. For an intersection frequently travelled through by autonomous vehicles, a statistical correlation between a number of pedestrians at an intersection and whether a human will take control of an autonomous vehicle at the intersection can be determined. In addition, given sufficient training data collected at the intersection, a probability distribution over a number of pedestrians at the intersection can be computed. Still further, given sufficient training data at the intersection, the probability distribution over the number of pedestrians at the intersection can be a function of time. In other words, there may be a first probability distribution over the number of pedestrians at the intersection for a first time and day (e.g., 9:00 a.m. on Saturday) and a second probability distribution over the number of pedestrians at the intersection for a second time and day (e.g., noon on Monday). Thus, when the computing system is determining a likelihood that a human will take control of the autonomous vehicle when the autonomous vehicle is travelling through the intersection, the computing system can sample from the probability distribution over the number of pedestrians in the intersection and then output the likelihood of the human taking control of the autonomous vehicle based upon the sample value. Hence, if there is sufficient training data for each intersection in the geographic region, the computing system can utilize the computer-implemented model to output likelihoods of the human taking control of the autonomous vehicle at each intersection along candidate routes between the origin location and the destination location.

For some intersections, however, there may be sparse (or no) training data, and accordingly the computer-implemented model may not be well-suited for estimating likelihood of an operation-influencing event at those intersections. Accordingly, described herein are technologies related to computing a first likelihood of occurrence of an operation-influencing event for a first location where there is a relatively large amount of training data, and subsequently computing a second likelihood of occurrence of the operation-influencing event for a second location where there is little (or no) training data, wherein the second likelihood is computed based upon the first likelihood. For instance, kriging can be employed to compute the second likelihood based upon the first likelihood. Further, the second likelihood can be computed as a function of distance between the first geographic location and the second geographic location. Using this approach, likelihoods of occurrence of operation-influencing events can be computed for locations where there is little or no training data for such locations.

Turning to FIG. 1, an exemplary computing system 100 that is configured to construct a computer-implemented model that models likelihood of occurrence of one or more operation-influencing events at geographic locations is illustrated. The computing system 100 includes a processor 102 and memory 104, wherein the memory 104 has a model generation application 106 loaded therein. As will be described in greater detail below, the model generation application 106 (when executed by the processor 102) is configured to construct a computer-implemented model that models likelihoods of occurrence of an operation-influencing event across geographic locations (e.g., intersections in a road network).

The computing system 100 additionally comprises a data store 108. The data store 108 comprises training data 110 that represents observations of spatiotemporal factors collected from vehicles (autonomous vehicles and/or human-driven vehicles) when the vehicles travelled over geographic locations. For purposes of explanation, examples provided herein relate to intersections in a road network, where the intersections are geographic locations. It is to be understood, however, that a geographic location may be a road segment, a part of a road segment, and so forth. In addition, the training data 110 can include, for observed spatiotemporal factor(s) at a geographic location, an indication as to whether or not an operation-influencing event occurred. Thus, for example, for a first intersection in a road network, the training data 110 can include numbers of pedestrians observed by autonomous vehicles at the intersection at different points in time and can further include indications as to whether there were operation-influencing events with respect to the autonomous vehicles at the intersection at the different points in time. Examples of spatiotemporal factors and operation-influencing events will be set forth below.

Exemplary operation-influencing events can include, but are not limited to: 1) a human driver taking control of an autonomous vehicle (either from within the vehicle or remotely); 2) the autonomous vehicle suddenly stopping (e.g., deceleration of the autonomous vehicle being above a threshold); 3) the autonomous vehicle "jerking" (caused by sudden changes in acceleration/deceleration); 4) a quick swerve (e.g., yaw rate of the autonomous vehicle exceeding a threshold); 5) an unplanned maneuver, which can include an unexpected stop, an unexpected turn, re-routing, etc.; 6) an object getting "too close" to the autonomous vehicle (e.g., a bicycle comes within a threshold distance of the autonomous vehicle), etc.

There are several spatiotemporal factors that may be, individually or collectively, predictors of operation-influencing events. For example, a correlation may exist between a number of pedestrians at an intersection and whether a human driver takes control of the autonomous vehicle at the intersection. Exemplary spatiotemporal factors for a geographic location include, but are not limited to: 1) incidence of emergency vehicles (e.g., fire trucks, police cars, etc.); 2) incidence of steam (whether natural or human generated, for example, steam emitted from manhole covers); 3) incidence of one or more double parked vehicles; 4) a number of pedestrians; 5) density of pedestrians within a geospatial area; 6) a number of cyclists; 7) a number of vehicles; 8) a weather condition (e.g., rain, strong wind, fog, etc.); 9) incidence of debris; 10) lighting conditions primarily associated with a time of day (e.g., bright sunlight, low sunlight, no sunlight, diffuse sunlight); 11) lighting conditions primarily caused by man-made objects (e.g., high volumes of fluorescent light relative to ambient light, as generated by street-illuminating devices such as street lights and/or artificial signage); 12) incidence of vegetation occluding a roadway (e.g., overhanging trees, overhanging vines, etc.); 13) incidence of roadway features obstructing sight lines of the autonomous vehicle (e.g., signs in the median of the road, garbage cans, etc.); 14) incidence of roadway features that cannot be navigated through without accommodation (e.g., potholes, road construction, sharp turns, intersections with high curvatures, narrow roads, roads without marked center lines, etc.); 15) a number of other autonomous vehicles, and so forth.

The model generation application 106 can generate a computer-implemented model 112 based upon the training data 110. More specifically, the model generation application 106 can generate the computer-implemented model 112 as a mixed-effects model (though this is not the only such model possible and its description herein is provided without prejudice to the application of other modeling frameworks). In a mixed-effects model framework, observations are assumed to be clustered according to some process (in a spatial mixed-effects model, observations can be clustered spatially, e.g. per intersection). The relationship among the clusters is specified by a general form (e.g. by a covariance matrix where clusters are related by their distances from each other, with distances weighted by some scaling factor learned from data). For the so-called "fixed" effects, their estimated impacts on the target variable (e.g. human takeovers) are calculated by pooling all of the data across all clusters, that is, individual clusters do not receive their own estimates. For the so-called "random" effects, their estimated impacts on the target variable are calculated "with shrinkage", e.g., both pooled and per-cluster level effects are calculated and the two are weighted according to the amount of variation at the per-cluster level and across clusters, through the covariance matrix. Thus, the distinction of whether to model a given factor as a fixed or random effect depends on whether this effect's influence on the target variable is expected to be constant across clusters or whether it is expected to differ at the level of a cluster. Note that the modeler's expectation of whether an effect should be fixed or random can be tested, e.g., using a variogram, which calculates how correlated the effects of nearby observations are in terms of their impacts on the operation-influencing events. If the effects of nearby observations are highly correlated, then this factor should be considered for inclusion in the set of random effects.

Applying this modeling framework to the application described herein, observed operation-influencing events and spatiotemporal factors are assumed to be clustered at intersections in a road network. The model generation application 106 can model these spatiotemporal factors at each intersection (where observations are obtained) as either fixed effects or random effects, depending on the per-factor assumptions as described above.

In an example, the computer-implemented model 112 can be constructed to output likelihoods of the autonomous vehicle making a sudden stop at a given intersection in a set of intersections, wherein the predictive spatiotemporal factors include a number of pedestrians observed at the intersections, a number of cyclists observed at the intersections, and incidence of double-parked cars in proximity to the intersections. The training data 110 can include values for these spatiotemporal factors for a first set of intersections in a road network, wherein the values for the first set of intersections includes, for each pass through the first set of intersections by a vehicle, values for the spatiotemporal factors for the pass and an indication as to whether the autonomous vehicle suddenly stopped during the pass. The training data 110, however, may include sparse (or no) data for a second set of intersections in the road network. The model generator application 106 can identify locations of intersections where there is no (or sparse) training data but can otherwise effectively ignore such intersections.

For the first set of intersections in the road network, the spatiotemporal factors "number of pedestrians", "number of cyclists", and "incidence of a double-parked vehicle" can be modeled as fixed effects—in which case the model generator application 106 calculates predicted effects for these factors by pooling all observations across all intersections and calculating a single predicted effect (effectively treating all intersections as a single intersection) These same spatiotemporal factors, e.g., "number of pedestrians", "number of cyclists", and "incidence of a double-parked vehicle" can also be modeled as random effects—in which case the model generator application 106 calculates predicted effects for these factors by calculating both pooled and per-intersection level effects for each variable. The pooled and per-intersection effects are weighted according to the covariance matrix that the model generator application 106 learns from the data, after a general form is pre-specified as an input to the model. For instance, the general form of the covariances between intersections can be a function of the distances between intersections, wherein the distances can be Euclidean distances between the intersections, shortest paths along a road network between the intersections, etc., so long as the resulting covariance matrix is pseudo-invertible.

When the computer-implemented model 112 is provided with values for the spatiotemporal factors at the first set of intersections, the computer-implemented model 112 can output likelihoods of an autonomous vehicle coming to a sudden stop at such intersections. The values for the spatiotemporal factors can be observed values (e.g., from other autonomous vehicles in the road network) or sampled from a probability distribution over the spatiotemporal factors. Computing values for likelihoods of occurrence of the sudden stop at intersections where there is no training data is described in greater detail below.

Figure 2:
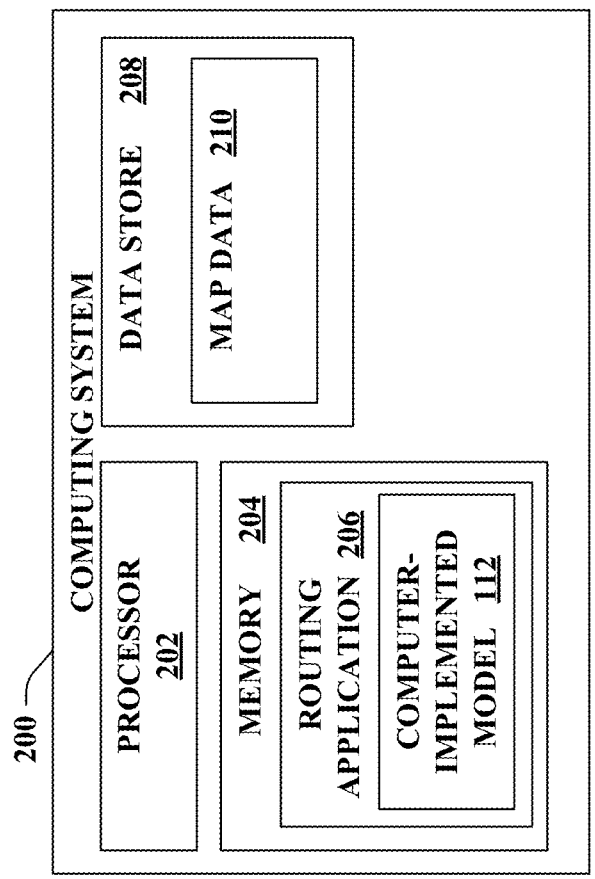
FIG. 2 illustrates a functional block diagram of an exemplary computing system that is configured to identify a route between an origin location and a destination location

Referring now to FIG. 2, an exemplary computing system 200 that is configured to identify a route between an origin location and a destination location based upon estimated likelihoods of occurrence of an operation-influencing event of an autonomous vehicle if the autonomous vehicle were to travel through certain geographic locations (e.g., intersections) is illustrated. The computing system 200 includes a processor 202 and memory 204, wherein the memory 204 has a routing application 206 loaded therein. As will be described in greater detail below, the routing application 206 (when executed by the processor 202) is generally configured to identify a route for an autonomous vehicle to follow from an origin location to a destination location. The routing application 206 includes or has access to the computer-implemented model 112.

The computing system 200 further includes a data store 208, which comprises map data 210. In general, the map data 210 comprises a map of the road network, which is also represented by the computer-implemented model 112. The routing application 206 is configured to identify a route for an autonomous vehicle to follow from the origin location to the destination location based upon the map data 210 and the computer-implemented model 112. More specifically, the routing application 206 can identify a route between the origin application to the destination location based upon metrics such as shortest distance, fastest travel time, and so forth. In addition, the routing application 206 can identify the route based upon likelihoods of occurrence of operation-influencing events at intersections that may be travelled through by the autonomous vehicle as the autonomous vehicle navigates from the origin location to the destination location. The likelihoods of occurrence of an operation-influencing event at an intersection can be treated by the routing application 206 as a cost that can be balanced with the benefit of quickest travel time, for example. Thus, the routing application 206 can identify a route between the origin location and the destination location that is not the fastest route, but where there is a relatively low likelihood of the autonomous vehicle coming to a sudden stop, for instance.

In operation, the routing application 206 is provided with an origin location and a destination location for an autonomous vehicle. In addition, the routing application 206 is provided with values for spatiotemporal factors that are modeled as fixed effects and/or random effects in the computer-implemented model 112, wherein the values are provided for each spatiotemporal factor that is assigned to an intersection in the first set of intersections (described above). The values can be observed values for the intersections in the first set of intersections, wherein such values are observed currently or recently by vehicles (human-driven or autonomous) that travel through the intersections. In another example, the values can be generated by sampling from a probability distribution over potential values for the intersection, wherein the sampled values are provided to the computer-implemented model 112.

The computer-implemented model 112, responsive to receiving the values for the spatiotemporal factors at the intersections referenced above, computes a likelihood of occurrence of the operation-influencing event (the hard stop) at each intersection in the first set of intersections, wherein likelihoods of occurrence of the operation-influencing event are based upon the provided values for the spatiotemporal factors and values in the covariance matrix.

Subsequently, based upon the computed likelihoods of occurrence of the operation-influencing event at the intersections in the first set of intersections, likelihoods of occurrence of the operation-influencing event can be estimated for the second set of intersections (for which there is insufficient training data to estimate the likelihood of occurrence of the operation-influencing event, as described above). In an example, the computer-implemented model 112 can estimate likelihood of occurrence of the operation-influencing event for an intersection through use of extrapolation, where computed likelihoods of occurrence of the operation-influencing event at intersections in the first set of intersections are used to estimate likelihoods of occurrence of the operation-influencing event at intersections in the second set of intersections.

In a specific example, the computer-implemented model 112 can employ kriging when estimating the likelihoods of occurrence of the operation-influencing event at intersections in the second set of intersections (given the computed likelihoods of occurrence of the operation-influencing event at intersections in the first set of intersections). Specifically, in a mixed-effects model framework, the coefficients of the fixed effects are assumed to apply across intersections (whether those intersections have "sufficient" data or not), whereas the random effects are kriged for those intersections where insufficient information is available. When estimating the likelihood of occurrence of the operation-influencing event at intersections in the second set of intersections, the computer-implemented model 112 can consider distances between intersections (Euclidean distances, shortest distances via road networks, etc.). Hence, a likelihood of occurrence of the operation-influencing event at a first intersection (in the first set of intersections) that is geographically proximate to an intersection of interest (an intersection in the second set of intersections) may be more heavily weighted than a likelihood of occurrence of the operation-influencing event at a second intersection (in the first set of intersections) that is relatively far from the intersection of interest.

As indicated previously, responsive to the computer-implemented model 112 outputting likelihoods of occurrence of the operation-influencing event at intersections in the road network, the routing application 206 can identify a route between the origin location and the destination location, wherein the route is identified based upon the likelihoods of occurrence of the operation-influencing event. In some situations, it may be desirable to avoid intersections where the operation-influencing event may occur, and therefore the routing application 206 can identify a route that causes an autonomous vehicle that is to travel the route to avoid an intersection with an estimated high likelihood of occurrence of the operation-influencing event (even if travelling through the intersection would be the shortest and/or fastest route between the origin location and the destination location). In other situations, such as when it is desired to test the autonomous vehicle, it may be desirable to travel through locations where a high likelihood of occurrence of the operation-influencing event is estimated. Hence, the routing application 206 can identify a route that causes the autonomous vehicle, when navigating the route, to travel through an intersection where a relatively high likelihood of occurrence of the operation-influencing event is estimated (even when the route is not the shortest or fastest path between the origin location and the destination location).

While the computer-implemented model 112 has been described as a mixed effects model, other approaches for obtaining likelihoods of occurrence of an operation-influencing event at the first set of intersections are contemplated. For example, an artificial neural network (ANN) can be configured to receive, for an intersection in the first set of intersections, values of spatiotemporal factors at the intersection, and can output a likelihood of occurrence of at least one operation-influencing event at the intersection based upon the values of the spatiotemporal factors. Likelihoods of occurrence of the operation-influencing event can then be estimated for the second set of intersections based upon the likelihoods of occurrence of the operation-influencing event at the first set of intersections (computed by way of one or more ANNs). As noted above, the likelihoods of occurrence of the operation-influencing event at the second set of intersections can be estimated by way of kriging. Other types of models for estimating likelihoods of occurrence of an operation-influencing event at intersections are also contemplated.

Figure 3:
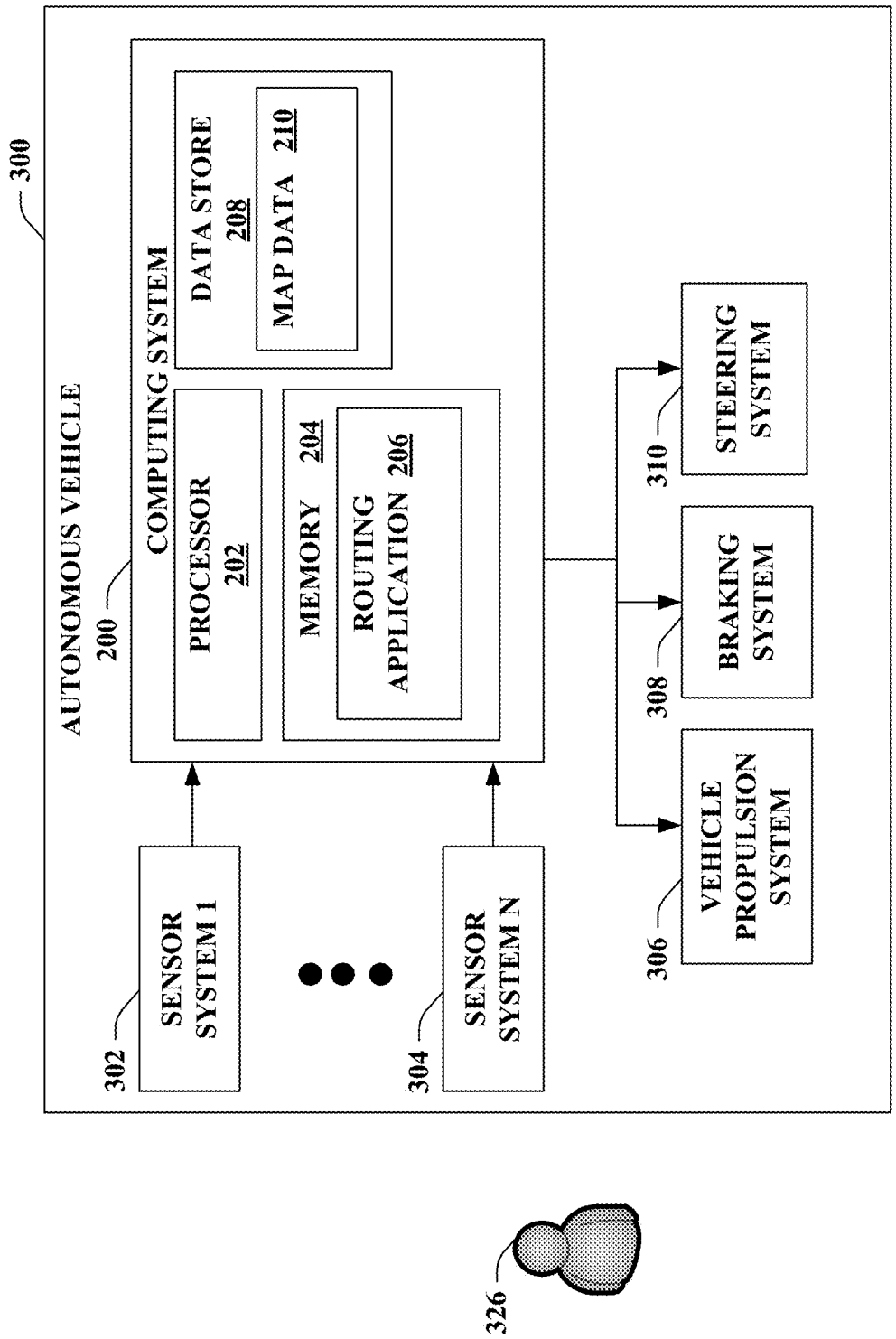
FIG. 3 illustrates a functional block diagram of an exemplary autonomous vehicle that includes the computing system depicted in FIG. 2.

Turning now to FIG. 3, an exemplary autonomous vehicle 300 is illustrated. The autonomous vehicle 300 can navigate about roadways without a human driver, wherein the autonomous vehicle 300 navigates about the roadways based upon sensor data outputted by sensor systems of the autonomous vehicle 300. The autonomous vehicle 300 includes a sensor system 1 302, . . . , and a sensor system N 304, where N can be substantially any integer greater than 1 (collectively referred to herein as sensor systems 302-304). The sensor systems 302-304 are of different types and are arranged about the autonomous vehicle 300. For example, the sensor system 1 302 may be a lidar sensor system and the sensor system N 304 may be a camera sensor (image) system. Other exemplary sensor systems included in the sensor systems 302-304 can include radar sensor systems, satellite-based radio navigation sensor systems (e.g., global positioning system (GPS) sensor systems), sonar sensor systems, infrared sensor systems, and the like. The sensor systems 302-304 generate sensor data. For instance, the radar sensor systems can generate radar sensor data, the lidar sensor systems can generate lidar sensor data, the camera sensor systems can generate camera sensor data, etc.

The autonomous vehicle 300 further includes several mechanical systems that are used to effectuate appropriate motion of the autonomous vehicle 300. For instance, the mechanical systems can include, but are not limited to, a vehicle propulsion system 306, a braking system 308, and a steering system 310 (collectively, "the mechanical systems 306-310"). The vehicle propulsion system 306 may be an electric motor, an internal combustion engine, or a combination thereof. The braking system 308 can include an engine brake, brake pads, actuators, and/or any other suitable componentry that is configured to assist in decelerating the autonomous vehicle 300. The steering system 310 includes suitable componentry that is configured to control the direction of movement of the autonomous vehicle 300.

The autonomous vehicle 300 further comprises the computing system 200, which includes the processor 202, the memory 204, and the data store 208, wherein the memory 204 includes the routing application 206, and the data store 208 includes the map data 210.

In an embodiment, the autonomous vehicle 300 may have a human operator 326 that rides in the autonomous vehicle 300. It is contemplated that the autonomous vehicle 300 typically operates autonomously. However, in certain driving scenarios, the autonomous vehicle 300 may be caused to transition from operating autonomously to being controlled by the human operator 326.

In an embodiment, the autonomous vehicle 300 may also include various components (not shown) that enable the autonomous vehicle 300 to be (optionally) operated by the human operator 326. For instance, the components may include a driver seat, a steering wheel, a brake pedal, an acceleration pedal, a gear selector, mirrors, a speedometer, an accelerometer, etc.

Figure 4:
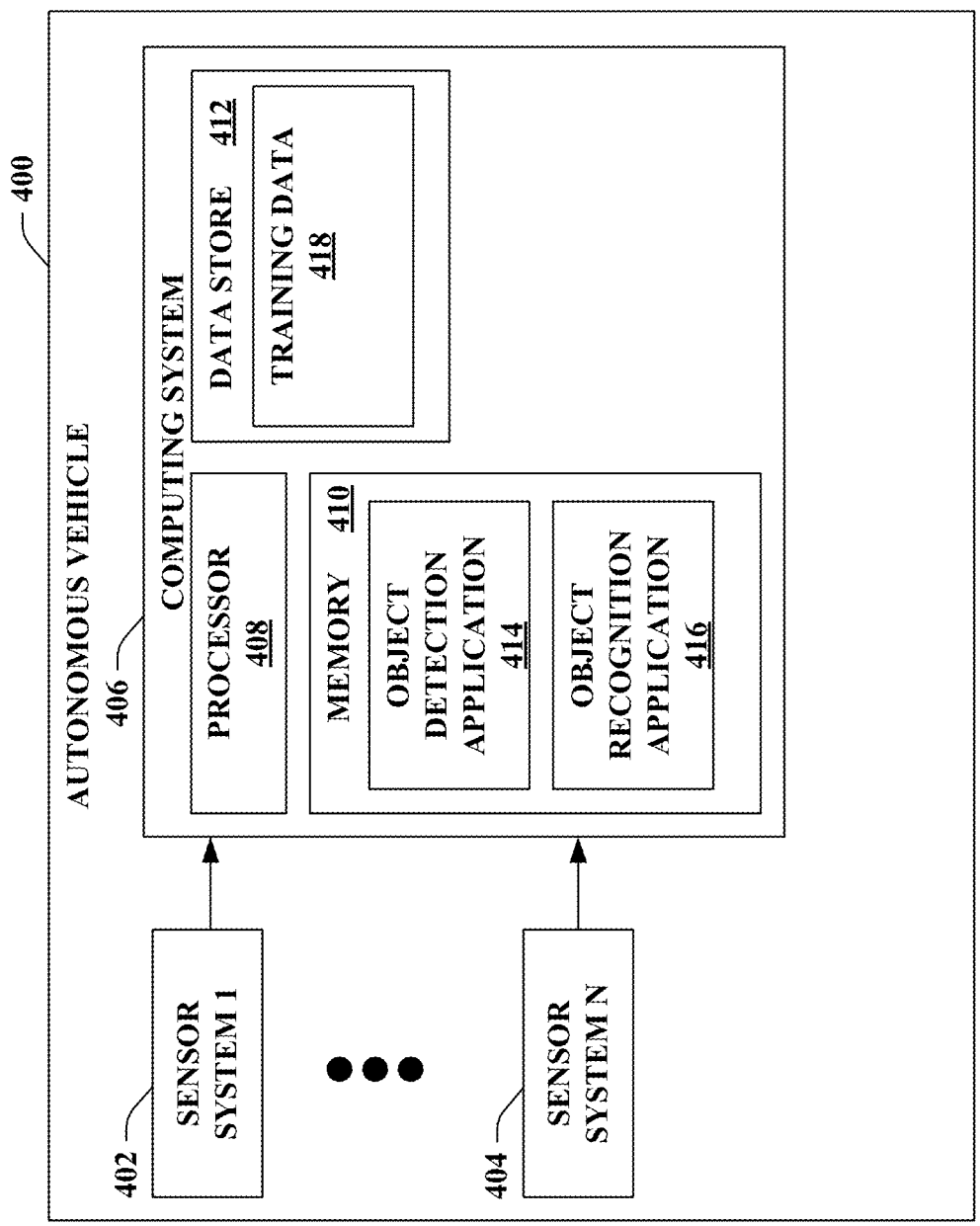
FIG. 4 illustrates a functional block diagram of an exemplary autonomous vehicle that is configured to generate training data.

Referring now to FIG. 4, an exemplary autonomous vehicle 400 that is configured to generate the training data 110 (used to construct the computer-implemented model 112) is illustrated. As shown in FIG. 4, the autonomous vehicle 400 includes the sensor systems 402-404. The autonomous vehicle 400 also includes a computing system 406, wherein the computing system 406 comprises a processor 408, memory 410, and a data store 412. The memory 410 has an object detection application 414 loaded therein as well as an object recognition application 416 loaded therein. The object detection application 414 is configured to detect when an object in a driving environment of the autonomous vehicle 400 is within a threshold distance of the autonomous vehicle 400 based upon the sensor data generated by the sensor systems 402-404. For instance, the object detection application 414 may detect that an object is within the threshold distance from the autonomous vehicle 400 based upon a lidar point cloud generated by a lidar sensor system of the autonomous vehicle 400. The objects detected by the object detection application 414 can include people, bicyclists, motor vehicles (cars, trucks, buses, etc.), vegetation, debris, and so forth.

The object recognition application 416 is configured to recognize a type of object detected by the object detection application 414 from amongst predefined types based upon the sensor data generated by the sensor systems 402-404. For instance, the predefined types may include car, truck, bus, bicycle, pedestrian, static object, or unknown. The object recognition application 416 may also be configured to identify empty space in a driving environment of the autonomous vehicle 400.

The object recognition application 416 can generate training data 418 based upon objects recognized by the object detection application 414. For example, the object recognition application 416, responsive to identifying an object based upon the sensor data, can cause the following information to be stored in the data store 412 as the training data 418: 1) an identifier of a type of the detected object; 2) a time when the object was detected: 3) a geotag that is indicative of a geographic location of the object; 4) and an indication as to whether an operation-influencing event occurred when the object was identified. The training data 418 can then be included in the training data 110 used to construct the computer-implemented model 112.

Figure 5:
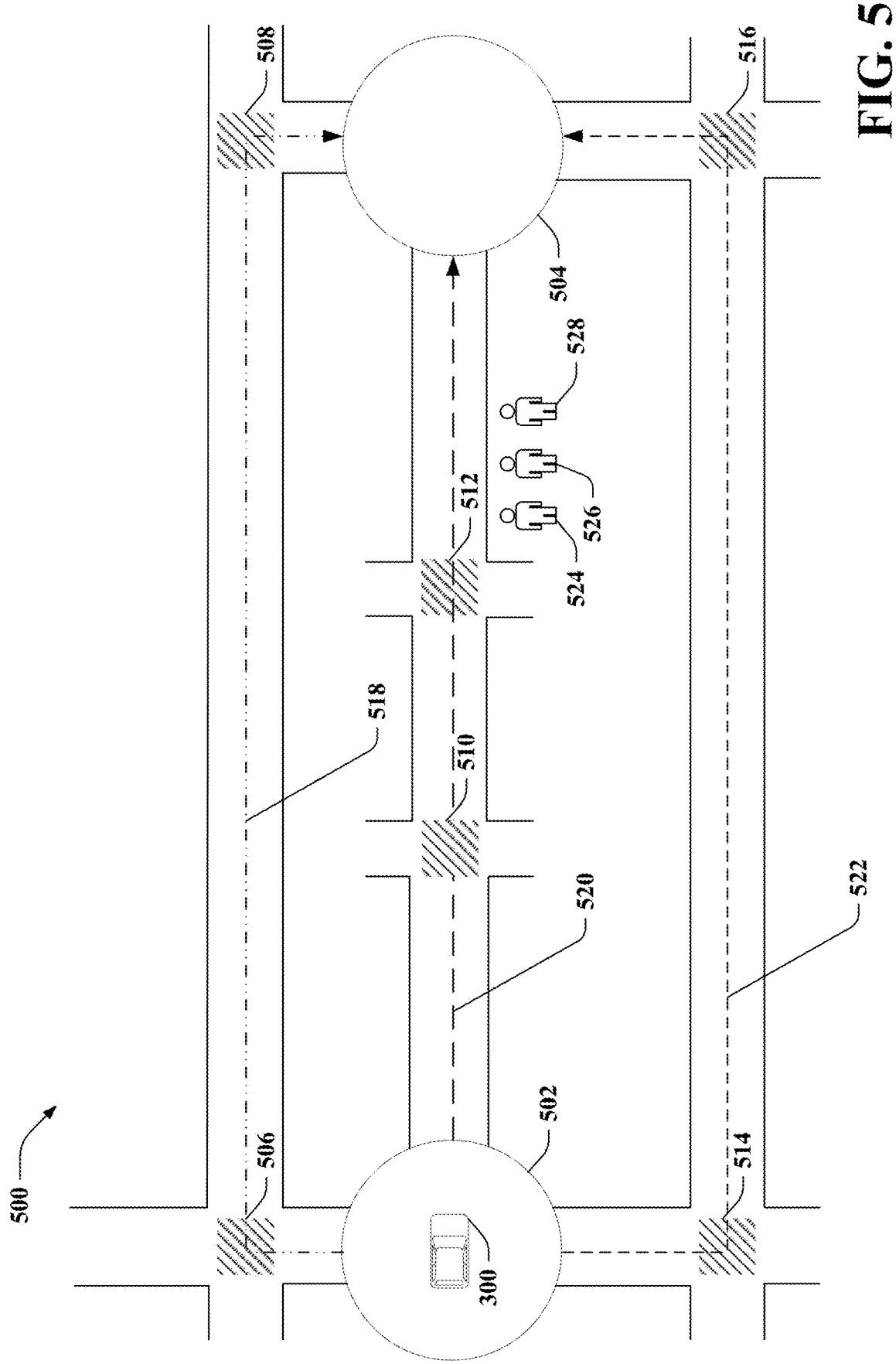
FIG. 5 illustrates an exemplary driving environment of an autonomous vehicle.

FIGS. 5-9 illustrate a specific example of aspects described above. In FIGS. 5-9, the geographic locations are intersections. Referring now to FIG. 5, an exemplary driving environment 500 is illustrated. The driving environment 500 includes the autonomous vehicle 300. The autonomous vehicle 300 is initially located at an origin location 502 in the driving environment 500 and is to travel to a destination location 504 in the driving environment 500.

The driving environment 500 includes a first candidate route 518 from the origin location 502 to the destination location 504, a second candidate route 520 from the origin location 502 to the destination location 504, and a third candidate route 522 from the origin location 502 to the destination location 504 (collectively, "the candidate routes 518-522"). The first candidate route 518 includes a first intersection 506 and a second intersection 508 that would be traversed by the autonomous vehicle 300 if the autonomous vehicle 300 were to follow the first candidate route 518. The second candidate route 520 includes a third intersection 510 and a fourth intersection 512 that would be traversed by the autonomous vehicle 300 if the autonomous vehicle 300 were to follow the second candidate route 520. The third candidate route 522 includes a fifth intersection 514 and a sixth intersection 516 that would be traversed by the autonomous vehicle 300 if the autonomous vehicle 300 were to follow the third candidate route 522.

The candidate routes 518-522 may vary in length. For instance, the first candidate route 518 may be a longer distance from the origin location 502 to the destination location 504 than the second candidate route 522. The driving environment 500 includes a plurality of pedestrians 524-526 (i.e., a spatiotemporal factor). The plurality of pedestrians 524-526 are closely clustered around the fourth intersection 512. In an example, there may be sufficient data in the training data 110 such that the computer-implemented model 112 can model pedestrians as fixed and/or random effects at the intersections 506, 508, 512, 514, and 516, but there may be insufficient data in the training data 110 to model pedestrians as fixed and/or random effects at the intersection 510. As described previously, the computer-implemented model 112 can be provided with the number of pedestrians at the intersections 506, 508, 512, 514, and 516 (if known) and/or can sample from a probability distribution for such intersections. Based upon the number of intersections and values in a covariance matrix, likelihoods of occurrence of an operation-influencing event can be estimated for the autonomous vehicle 300 at the intersections 506, 508, 512, 514, and 516. Kriging can be employed to estimate the likelihood of occurrence of an operation-influencing event at the intersection 510 for the autonomous vehicle 300.

Figure 6:
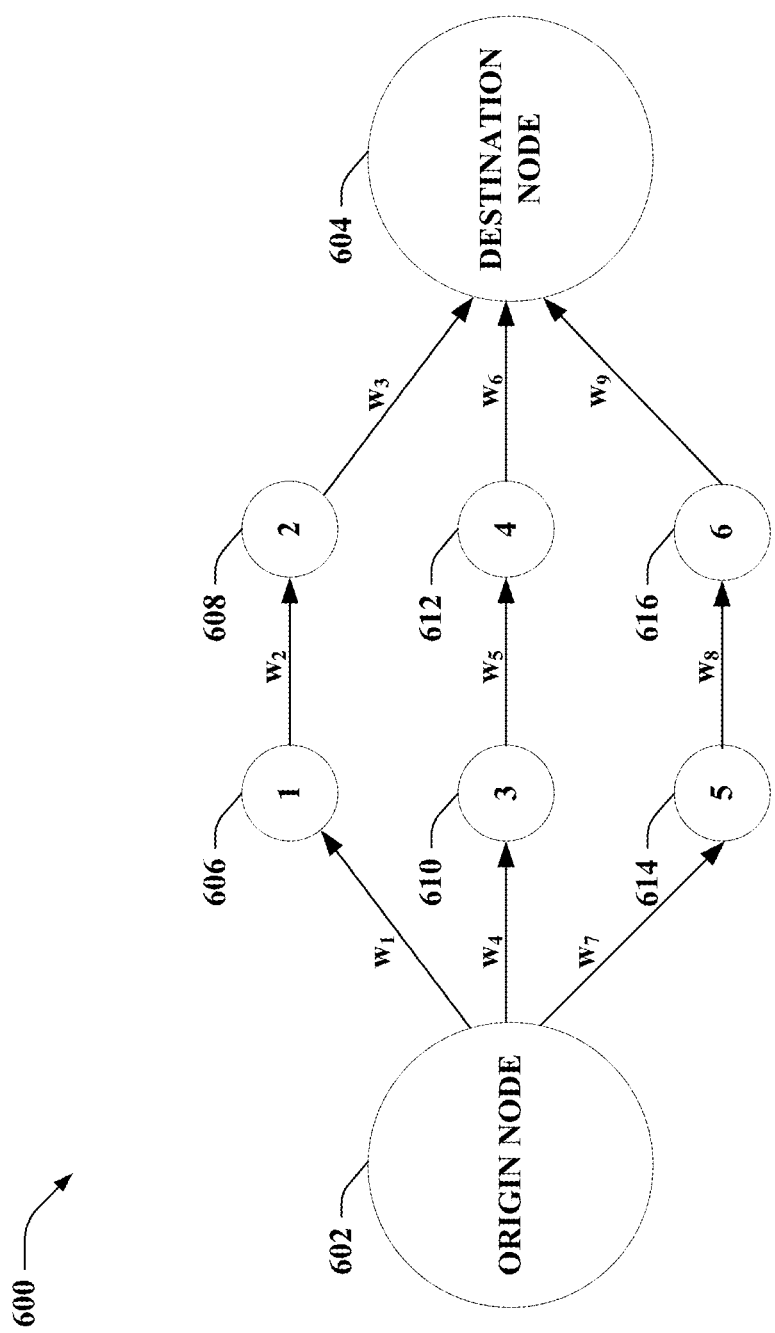
FIGS. 6 and 7 illustrate exemplary weighted directed graphs.

Turning now to FIG. 6, an exemplary weighted directed graph 600 is illustrated. The routing application 206 of the computing system 300 can generate the weighted directed graph 600 based upon the map data 210, wherein the weights, for example, can be indicative of estimated amount of time to drive between intersections and/or distance between intersections, as described below. The weighted directed graph 600 is based upon the driving environment 500 described above in the description of FIG. 5.

As such, the weighted directed graph 600 includes an origin node 602 that represents the origin location 502 of the autonomous vehicle 300 and a destination node 604 that represents the destination location 504 of the autonomous vehicle 300. The weighted directed graph 600 additionally includes a first node 606, a second node 608, a third node 610, a fourth node 612, a fifth node 614, and a sixth node 616 (collectively, "the nodes 606-616"). Each node in the nodes 606-616 represents an intersection in the intersections 506-516. For instance, the first node 606 represents the first intersection 506, the second node 608 represents the second intersection 608, and so forth.

The weighted directed graph 600 further includes directed edges (indicated by arrows in FIG. 6) that couple at least some of the origin node 602, the destination node 604, and the nodes 606-616. Each directed edge in the directed edges is assigned to a road segment that connects an intersection in the driving environment 500 to another intersection in the driving environment 500, the origin location 502 to an intersection in the driving environment 500, or an intersection in the driving environment 500 to the destination location 504. Each directed edge is assigned a weight in weights $w_1$ to $w_9$, wherein the weight is indicative of the cost (e.g., a time cost, a distance cost, etc.) to the autonomous vehicle 300 in selecting a route that passes through an intersection in the intersections 506-516 of the driving environment 500. For instance, the weights $w_1$ to $w_3$ are indicative of a cost to the autonomous vehicle 300 in selecting the first candidate route 518 for the autonomous vehicle 300 to traverse from the origin location 502 to the destination location 504.

Figure 7:
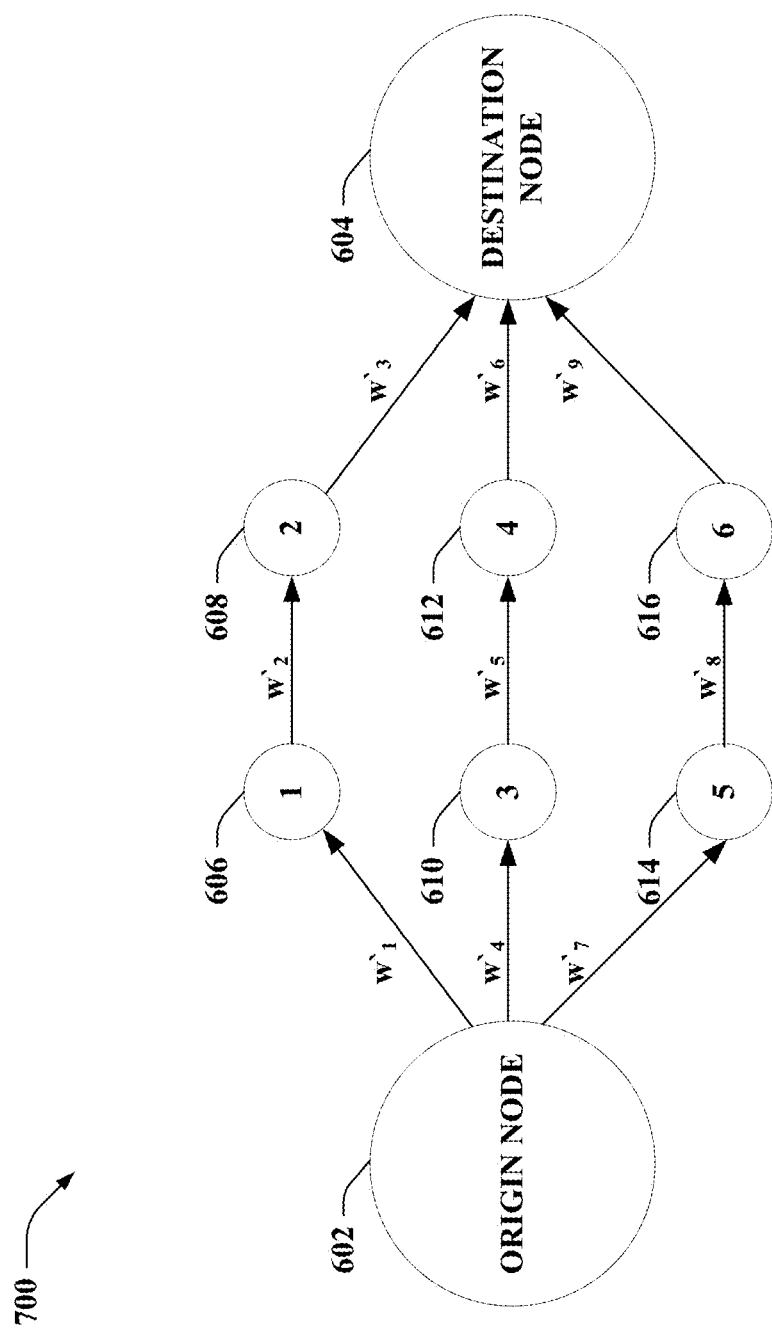

With reference now to FIG. 7, an exemplary weighted directed graph 700 is illustrated. The routing application 206 of the computing system 200 can generate the weighted directed graph 700. The weighted directed graph 700 includes the origin node 602, the destination node 604, the nodes 606-616, and the directed edges as described above with respect to FIG. 6. However, as shown in FIG. 7, the routing application 206 has modified each of the weights $w_1$ to $w_9$ to generate modified weights $w'_1$ to $w'_9$, respectively, thereby generating the weighted directed graph 700. Each of the modified weights $w'_1$ to $w'$ are based upon one or more scores (described above) output by the computer-implemented model 112.

As described above, the computer-implemented model 112 can output likelihoods of occurrence of an operation-influencing event with respect to the autonomous vehicle 300 if the autonomous vehicle were to travel through the intersections. The weights $w'_1$ to $w'_9$ can be based upon the weights $w_1$ to $w_9$ as well as the likelihoods referenced above.

Figure 8:
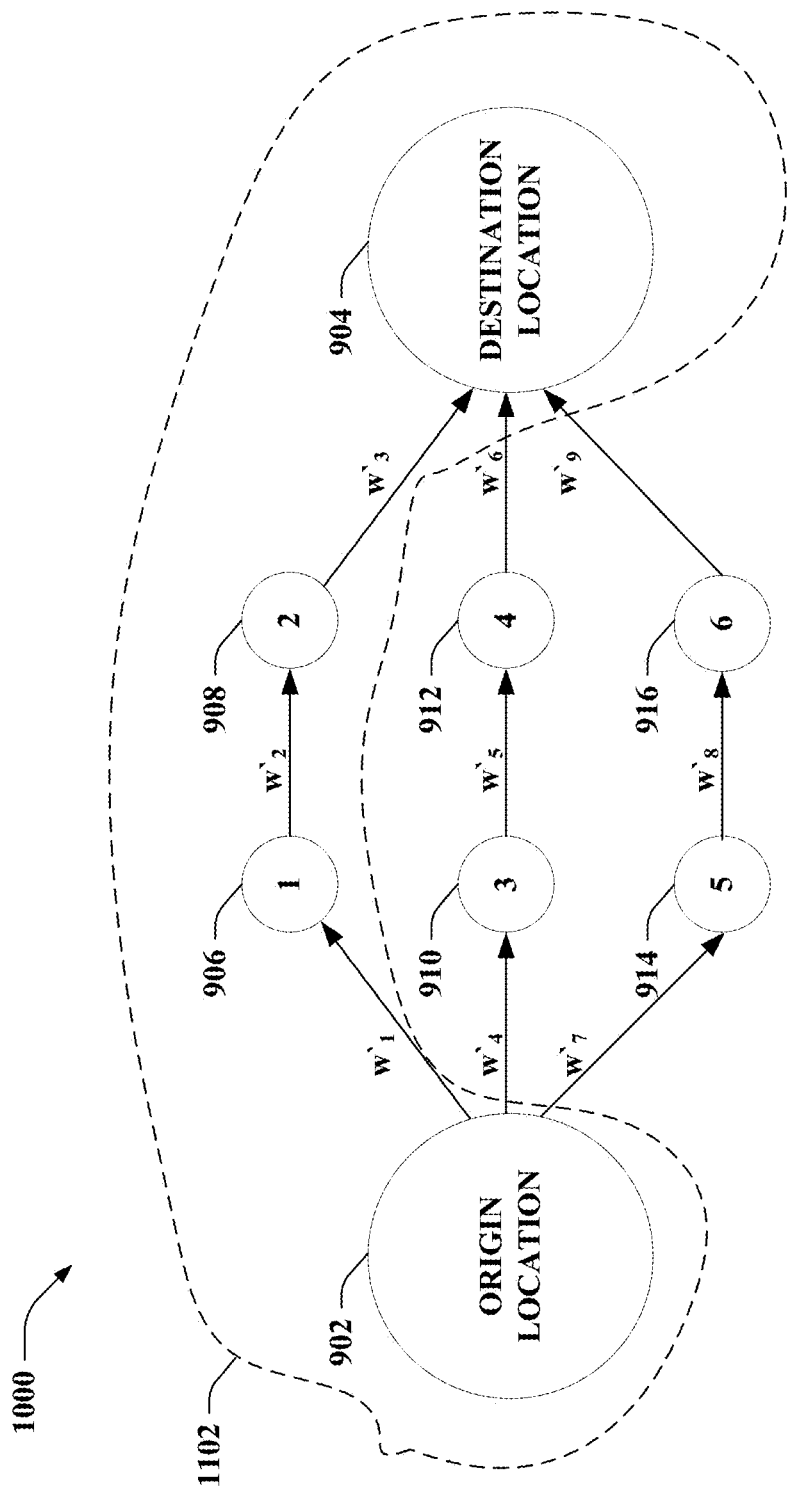
FIG. 8 illustrates a path through the weighted directed graph illustrated in FIG. 7.

Referring now to FIG. 8, a path 802 (illustrated via dotted lines in FIG. 8) through the weighted directed graph 700 shown in FIG. 7 is illustrated, wherein the path 1102 has the lowest aggregate weight from amongst all possible paths. The routing application 206 of the computing system 200 can determine the path 802 through the graph by applying a shortest path algorithm to the weighted directed graph 700. For instance, the shortest path algorithm may be one of a Dijkstra's algorithm, a Bellman-Ford algorithm, or a Floyd-Warshall algorithm.

As shown in FIG. 8, the shortest path 802 includes the first node 606 and the second node 608 (as well as the origin node 602 and the destination node 604). Thus, the path 802 may correspond to the first candidate route 518 depicted in FIG. 5. Notably, the first candidate route 518 may not be the shortest route (from a time or a distance perspective) in the driving environment 500. Rather, the routing application 206 has identified the first candidate route 518 as the route to follow as the first candidate route 518 has the lowest cost (weight) to the autonomous vehicle 300 when likelihood of occurrence of an operation-influencing event is considered.

Figure 9:
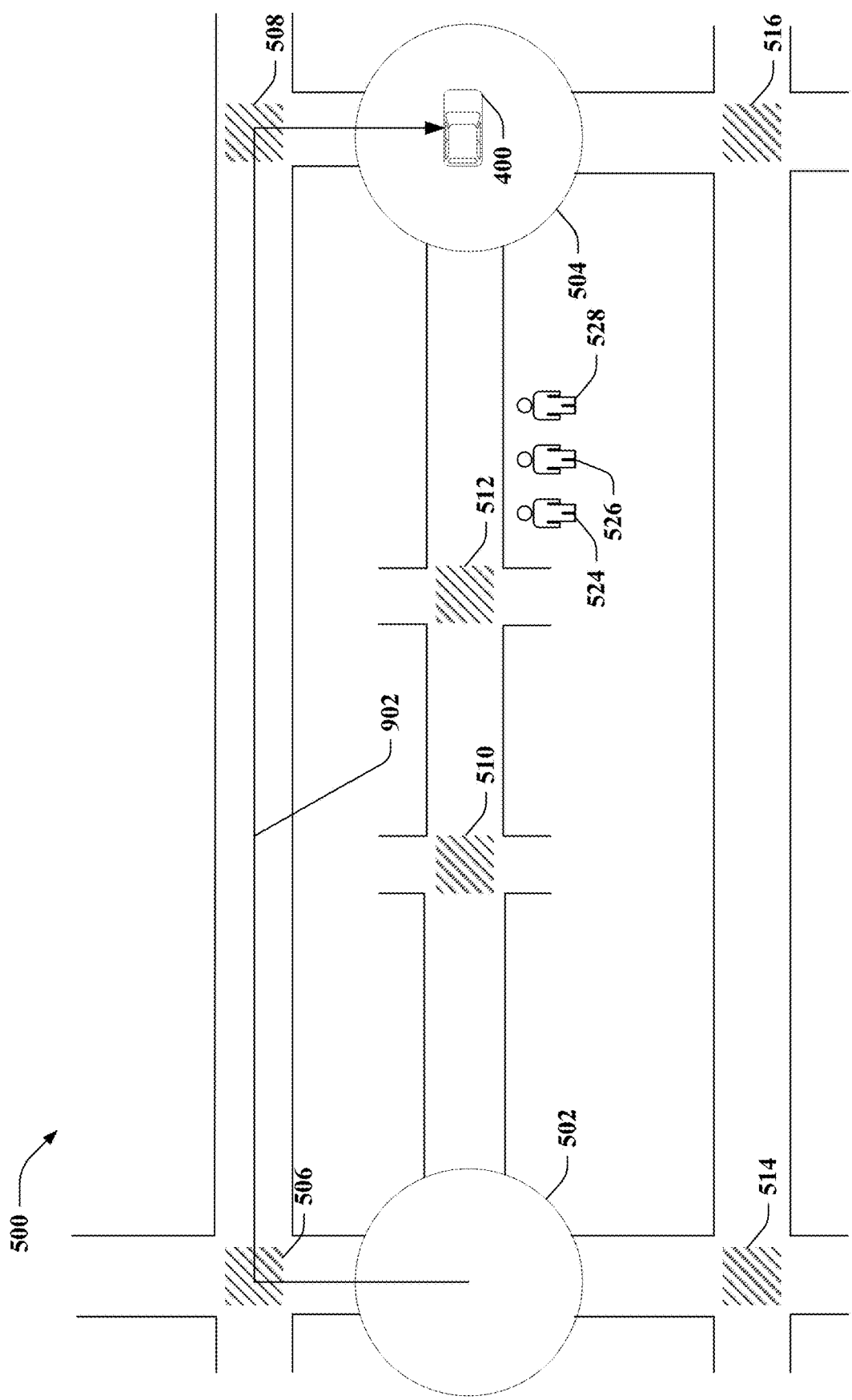
FIG. 9 illustrates an updated view of the exemplary driving environment illustrated in FIG. 5.

Turning now to FIG. 9, an updated view of the driving environment 500 depicted in FIG. 5 is illustrated. After the routing application 206 of the computing system 200 determines the path 802 through the weighted directed graph 700, the autonomous vehicle 300 may navigate from the origin location 502 to the destination location 504 along a route that corresponds to the path 802. More specifically, as the path 802 includes the first node 606 (which represents the first intersection 506) and the second node 608 (which represents the second intersection 508), the autonomous vehicle 300 may control at least one of the vehicle propulsion system 306, the braking system 308, or the steering system 310 such that the autonomous vehicle 300 follows the first candidate route 518 (now referred to as "the route 902") from the origin location 502 through the first intersection 506 and the second intersection 508 in order to arrive at the destination location 504.

Figure 10:
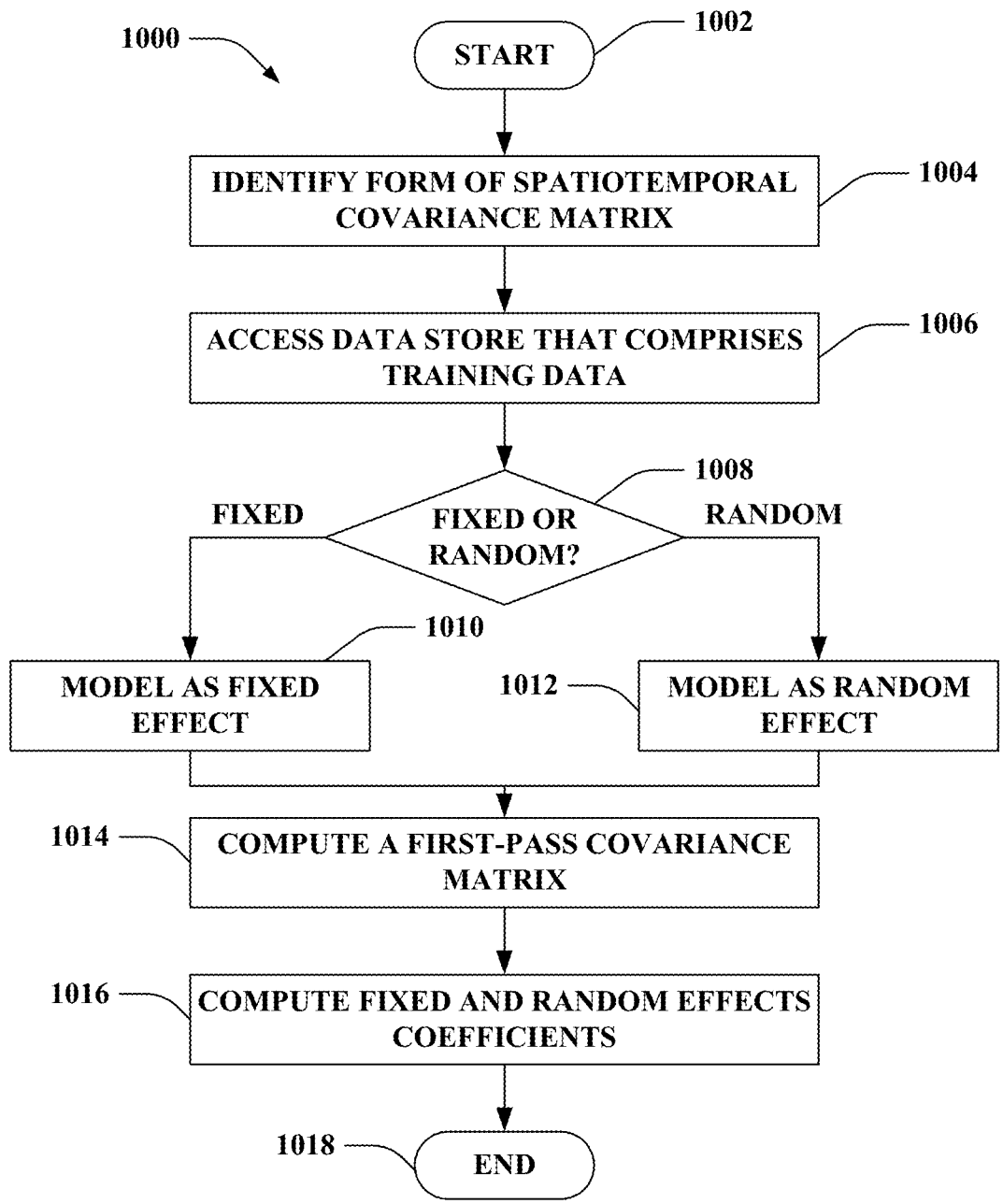
FIG. 10 is a flow diagram that illustrates an exemplary methodology for constructing a computer-implemented model that is usable to output likelihoods of occurrence of operation-influencing events at different geographic locations.
Figure 11:
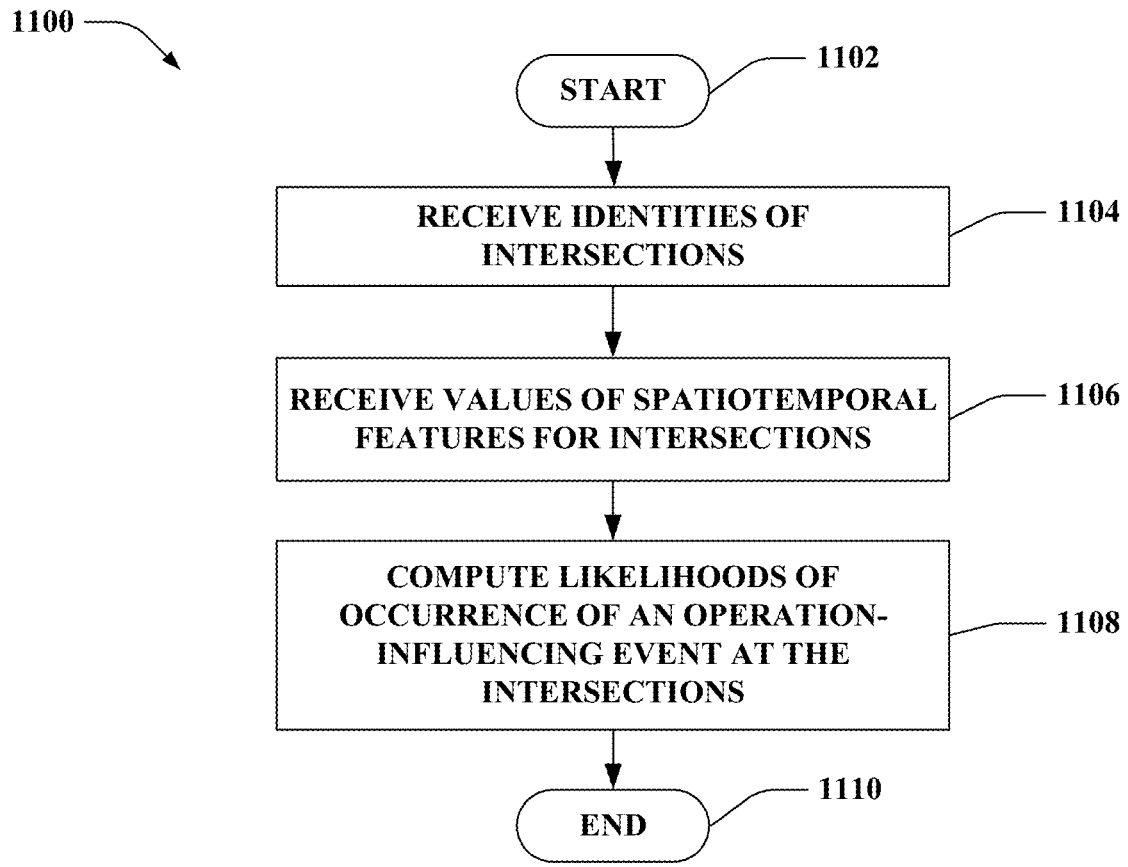
FIG. 11 is a flow diagram that illustrates an exemplary methodology for identifying a route for an autonomous vehicle between an origin location and a destination location.

FIGS. 10-11 illustrate exemplary methodologies relating to routing of an autonomous vehicle from an origin location to a destination location. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

With reference to FIG. 10, a methodology 1000 performed by a computing system when constructing a computer-implemented model that is usable to compute likelihoods of occurrence of an operation-influencing event at different geographic locations in a geographic region is illustrated. The methodology 1000 starts at 1002, and at 1004 a form of a spatiotemporal covariance matrix is identified, wherein coefficients of the covariance matrix are to be computed based upon Euclidean distances between intersections, travel distances between intersections in a road network that includes the intersections, etc. At 1006, a data store is accessed that includes training data, wherein the training data includes a plurality of collection sets, with each collection set including data generated by a vehicle when travelling over a geographic location (e.g., intersection). Specifically, each collection set includes: 1) an identity of the geographic location; 2) values for spatiotemporal factor (s) observed at the geographic location; 3) a timestamp that indicates when the values were obtained; and 4) an indication as to whether an operation-influencing event occurred during the collection. Thus, a geographic location in the geographic region may have numerous collections assigned thereto; contrarily, a second geographic location in the geographic region may have no collections (or a very small number of collections) assigned thereto.

At 1008, a determination is made, for each effect (e.g., each spatiotemporal factor), as to whether to model the effect as fixed or random. This determination is based on whether the effect's causal influence on operation-influencing events is expected to be constant across clusters (e.g. intersections) or vary in a per-intersection manner. This determination can be tested from the data e.g. by use of a variogram, which calculates how correlated the effects of nearby observations are in terms of their impacts on the operation-influencing events. When it is determined at 1008 that the effect is to be modeled as a fixed effect, then at 1010 the effect is modeled as a fixed effect. When it is determined at 1008 that the effect is to be modeled as a random effect, then at 1012 the effect is modeled as a random effect.

At 1014, a first-pass covariance matrix for the random effects across the geographic locations is computed (where the first-pass covariance matrix is computed based upon the form of the spatiotemporal covariance matrix identified at 1004). At 1016 the first-pass covariance matrix enters into a joint estimation process to compute the fixed and random effects coefficients. Accordingly, a mixed effects model is constructed, wherein when values for spatiotemporal factors are received for a geographic location in the first set of geographic locations, a likelihood (probability) of occurrence of the operation-influencing event with respect to the autonomous vehicle can be output by the model. Further, the model can include empty portions for a second set of geographic locations, wherein geographic locations in the second set of geographic locations were identified as having insufficient collections assigned thereto. The methodology 1000 completes at 1014.

Referring now to FIG. 11, an exemplary methodology 1100 (performed by a computing system) for estimating likelihoods of occurrence of an operation-influencing event at one or more intersections is illustrated. The methodology 1100 starts at 1102, and at 1104 an identification of the one or more intersections is received. For example, an indication of a geographic region (e.g., a city, a region in a city, etc.) can be received, and the one more intersections can be intersections in the geographic region.

At 1106, observations as to spatiotemporal factors at the intersections are received. For example, another autonomous vehicle or human-driven vehicle may report observations as to spatiotemporal factors at the one or more intersections. In another example, there may be a sufficient number of historic observations in the training data to allow for an observation about a spatiotemporal factor to be estimated for an intersection in the one or more intersections.

At 1108, based upon the observations received at 1106 and the fixed and random effects coefficients computed at 1016 (FIG. 10), estimates as to likelihoods of occurrence of the operation-influencing event at the one or more intersections can be computed. For intersections where there is insufficient training data to allow for computation of coefficients for the random effects, kriging can be employed to compute such coefficients. Thus, estimating a likelihood of occurrence of an operation-influencing event at an intersection can include predicting the random effects at the intersection. The methodology 1100 completes at 1110.

Figure 12:
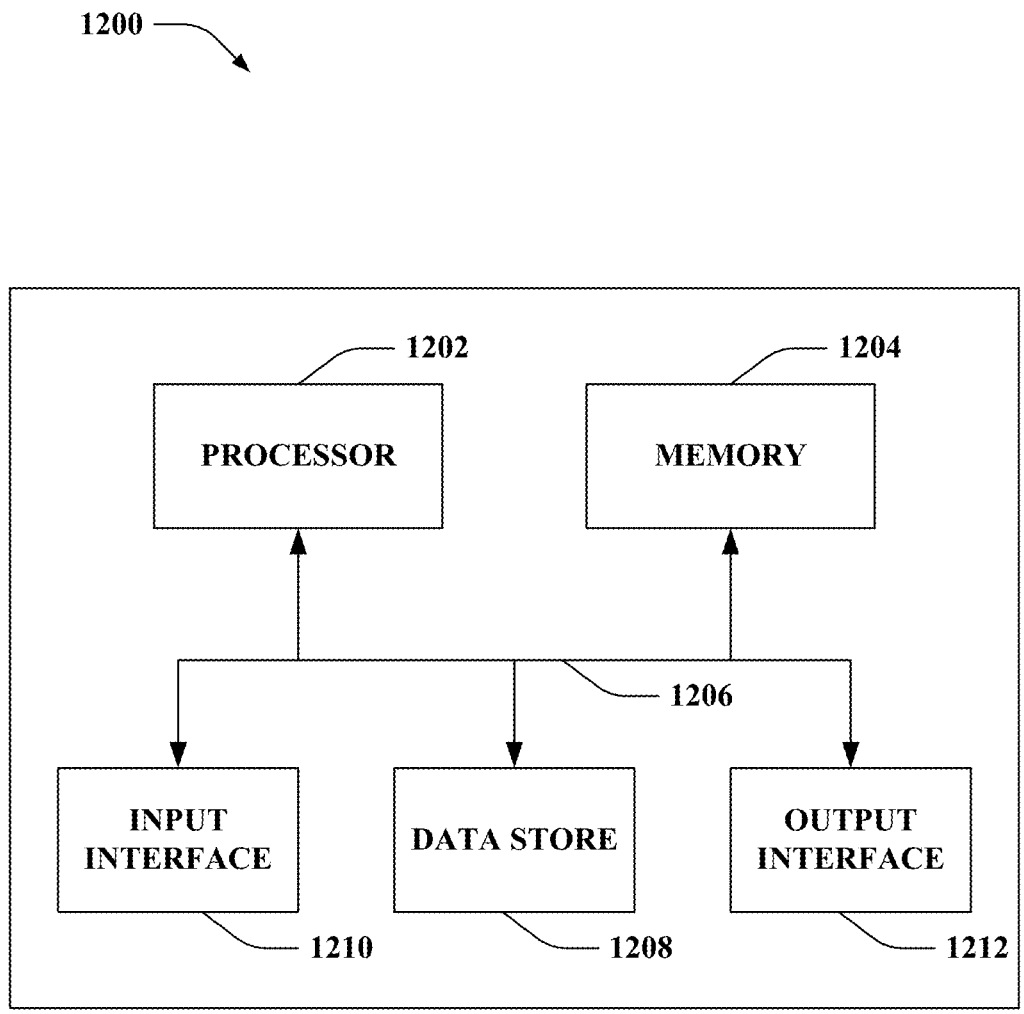
FIG. 12 illustrates an exemplary computing device.

Referring now to FIG. 12, a high-level illustration of an exemplary computing device 1200 that can be used in accordance with the systems and methodologies disclosed herein is illustrated. For instance, the computing device 1200 can be employed to construct a computer-implemented model. In another example, the computing device 1200 can be configured to compute likelihoods of operation-influencing events at geographic locations in a geographic region. The computing device 1200 includes at least one processor 1202 that executes instructions that are stored in a memory 1204. The instructions may be, for instance, instructions for implementing functionality described as being carried out by one or more systems discussed above or instructions for implementing one or more of the methods described above. The processor 1202 may be a graphics processing unit (GPU), a plurality of GPUs, a central processing unit (CPU), a plurality of CPUs, a multi-core processor, etc. The processor 1202 may access the memory 1204 by way of a system bus 1206. In addition to storing executable instructions, the memory 1204 may also store training data, computed likelihoods, computer-implemented models, map data, weighted directed graphs, etc.

The computing device 1200 additionally includes a data store 1208 that is accessible by the processor 1202 by way of the system bus 1206. The data store 1208 may include executable instructions, training data, computed likelihoods, computer-implemented models, map data, weighted directed graphs, etc.

The computing device 1200 also includes an input interface 1210 that allows external devices to communicate with the computing device 1200. For instance, the input interface 1210 may be used to receive instructions from an external computer device, etc. The computing device 1200 also includes an output interface 1212 that interfaces the computing device 1200 with one or more external devices. For example, the computing device 1200 may transmit control signals to the vehicle propulsion system 406, the braking system 408, and/or the steering system 410 by way of the output interface 1212.

Additionally, while illustrated as a single system, it is to be understood that the computing device 1200 may be a distributed system. Thus, for instance, several devices may be in communication by way of a network connection and may collectively perform tasks described as being performed by the computing device 1200.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, cellular, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle (AV) comprising:
a propulsion system;
a braking system;
a steering system; and
a computing system that is operably coupled to the propulsion system, the braking system, and the steering system, wherein the computing system comprises a processor and memory that stores instructions that, when executed by the processor, cause the processor to perform acts comprising:
receiving an origin location of the AV and a destination location of the AV, wherein at least one of the origin location or the destination location is within a city;
receiving a first value for a spatiotemporal factor at a first road intersection in the city;
computing a second value for the spatiotemporal factor at a second road intersection in the city based upon:
the first value for the spatiotemporal factor at the first intersection; and
a distance between the first road intersection and the second road intersection, wherein the second road intersection is within a route from amongst several possible routes between the origin location and the destination location;
computing a likelihood of occurrence of a predefined event at the second road intersection based upon the computed second value, wherein the predefined event relates to operation of the AV;
selecting the route between the origin location and the destination location from amongst the several possible routes based upon the computed likelihood of occurrence of the predefined event at the second road intersection; and
based upon the route being selected, controlling at least one of the propulsion system, the braking system, or the steering system to cause the AV to autonomously travel from the origin location to the destination location along the selected route.

2. The AV of claim 1, wherein the distance between the first road intersection and the second road intersection a Euclidean distance.

3. The AV of claim 1, wherein the distance between the first road intersection and the second road intersection is a shortest distance along roadways between the first road intersection and the second road intersection.

4. The AV of claim 1, wherein the second value of the spatiotemporal factor at the second road intersection is computed by way of kriging.

5. The AV of claim 1, wherein the memory has a mixed effects model stored therein, wherein the processor computes the likelihood of occurrence of the predefined event at the second road intersection through use of the mixed effects model.

6. The AV of claim 5, wherein the spatiotemporal factor is modeled as a fixed effect in the mixed effects model.

7. The AV of claim 5, wherein the spatiotemporal factor is modeled as a random effect in the mixed effects model.

8. The AV of claim 1, the acts further comprising:
receiving a value for a second spatiotemporal factor at the first road intersection, wherein the likelihood of occurrence of the predefined event at the second road intersection is computed based upon the value for the second spatiotemporal factor at the first road intersection.

9. The AV of claim 1, wherein the spatiotemporal factor is one of: a number of pedestrians observed at the first road intersection within a window of time; a number of bicyclists observed at the first road intersection within the window of time; or a number of vehicles at the first road intersection within the window of time.

10. The AV of claim 1, wherein the predefined event is a human operator taking control of the AV.

11. A method executed by a computing system, the method comprising:
receiving a request that an autonomous vehicle (AV) navigate from a first location to a second location within a city, wherein there are several possible routes from the first location to the second location;
responsive to receiving the request, receiving a first value of a spatiotemporal factor for a first intersection within the city;
based upon the first value of the spatiotemporal factor for the first intersection, computing a second value of the spatiotemporal factor at a second intersection, wherein the second intersection is included in a route from amongst the several possible routes;
computing a likelihood of occurrence of an event at the second intersection based upon the computed second value of the spatiotemporal factor at the second intersection, wherein occurrence of the invent relates to operation of the AV while the AV autonomously navigates within the city;
based upon likelihood of occurrence of the event at the second intersection, selecting the route from amongst the several possible routes; and
subsequent to selecting the route, causing the AV to autonomously navigate from the first location to the second location by way of the selected route.

12. The method of claim 11, wherein the second value of the spatiotemporal factor is computed based upon a distance between the first intersection and the second intersection.

13. The method of claim 11, wherein kriging is utilized to compute the second value of the spatiotemporal factor based upon the first value of the spatiotemporal factor.

14. The method of claim 11, wherein the AV comprises the computing system.

15. The method of claim 11, wherein the selected route is neither a route with a shortest distance between the first location and the second location nor a route that is computed to be a fastest route between the first location and the second location.

16. The method of claim 11, wherein the spatiotemporal factor is a driving maneuver that is to be performed by the AV.

17. The method of claim 11, further comprising:
sampling a value from a probability distribution over the spatiotemporal factor for the first intersection, wherein the sampled value is the first value of the spatiotemporal factor received by the computing system.

18. The method of claim 11, wherein the event is a hard stop of the AV.

19. An autonomous vehicle (AV) comprising:
a propulsion system;
a braking system;
a steering system; and
a computing system that is operably coupled to the propulsion system, the braking system, and the steering system, wherein the computing system comprises a processor and memory, wherein the memory stores instructions that, when executed by the processor, cause the processor to perform acts comprising:
receiving a request that the AV navigate from a first location to a second location within a city, wherein there are several possible routes from the first location to the second location;

responsive to receiving the request, receiving a first value of a spatiotemporal factor for a first intersection within the city;

based upon the first value of the spatiotemporal factor for the first intersection, computing a second value of the spatiotemporal factor at a second intersection, wherein the second intersection is included in a route from amongst the several possible routes;

computing a likelihood of occurrence of an event at the second intersection based upon the computed second value of the spatiotemporal factor at the second intersection, wherein occurrence of the invent relates to operation of the AV while the AV autonomously navigates within the city;

based upon likelihood of occurrence of the event at the second intersection, selecting the route from amongst the several possible routes; and subsequent to selecting the route, controlling the propulsion system, the steering system, and the braking system such that the AV to autonomously navigates from the first location to the second location by way of the selected route.

20. The AV of claim 19, wherein the second value of the spatiotemporal factor is computed based upon a distance between the first intersection and the second intersection.

\* \* \* \* \*